Aug. 19, 1947.  J. T. ROGERS  2,425,953
HAULING VEHICLE
Filed Dec. 18, 1945   2 Sheets-Sheet 1

Inventor
James T. Rogers
Cushman Darby & Cushman
Attorneys

Aug. 19, 1947.   J. T. ROGERS   2,425,953
HAULING VEHICLE
Filed Dec. 18, 1945   2 Sheets-Sheet 2

Inventor
James T. Rogers
Cushman Darby & Cushman
Attorneys

Patented Aug. 19, 1947

2,425,953

UNITED STATES PATENT OFFICE 2,425,953

HAULING VEHICLE

James T. Rogers, Nashville, Tenn., assignor to Rogers Manufacturing Company, Inc., Nashville, Tenn., a corporation of Tennessee Application December 18, 1945, Serial No. 635,713

5 Claims. (Cl. 298—19)

The present invention relates to vehicles for hauling rock, ore, soil or other heavy material, and having provision for dumping the contents from the body thereof.

The construction includes a pivoted truck or dump body, with toggle means actuated by a suitable source of power to pivot the body to discharge the contents. The invention is an improvement over such vehicles of the prior art in the simplicity and ruggedness of the mechanism provided to tilt the truck or dump body.

In the prior art, various types of toggle arrangements have been provided to elevate a vehicle body for discharge purposes, but the arrangements of the toggle mechanisms are usually such that special means must be provided to initially elevate the truck body around its pivot before power can be effectively applied to the toggle pivot point.

The present invention distinguishes in important respects from the prior art in the ruggedness and compactness of the elevating mechanism. The mechanism is arranged to operate entirely within the longitudinal frame members of the chassis, and to drop substantially below the chassis when the dump body is in its normal or hauling position. A compact and rugged construction is thus provided having a low center of gravity, giving the vehicle pronounced stability even when the dump body is elevated.

In the drawings, which are illustrative of the preferred form of the invention:

Figure 3:
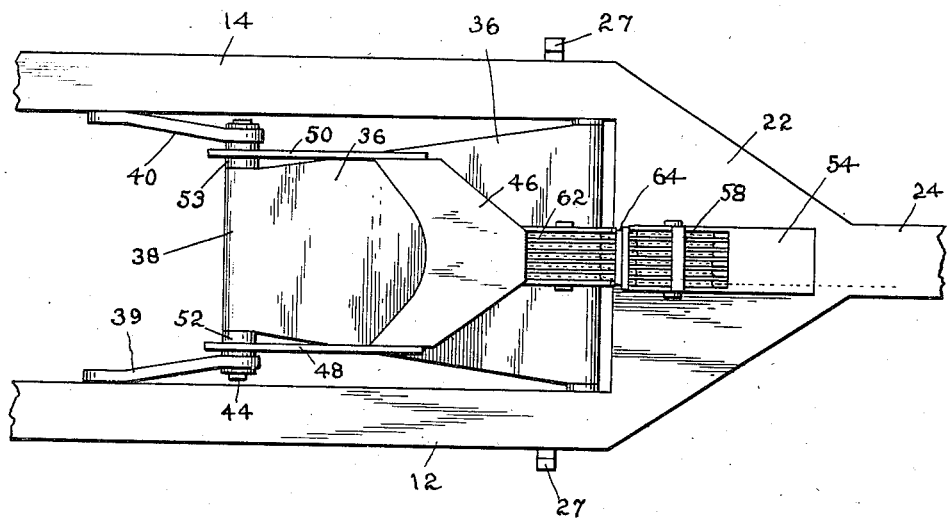
Figure 3 is an enlarged top plan view of the truck in the dumping position of Figure 2 with the dump body omitted.

The truck consists of a chassis 10 (Fig. 1) having spaced longitudinal frame members 12 and 14 (Fig. 3), the chassis being carried by wheels 16 in any conventional manner, and having a dump body 18 pivoted adjacent its rearward end to the rearward end of the chassis as at 20. Referring to Figure 3, the forward ends of the longitudinal frame members 12 and 14 of the chassis join together in a platform 22 from which a central draft beam member 24 extends forwardly for attachment to a tractor or the like employed to haul the truck, suitable connecting means 26 being provided on the end of the beam 24. When in normal position, the lower side frame members of the dump body rest between side supporting lugs 27 secured to the frame members 12 and 14 and extending upwardly therefrom.

Figure 4:
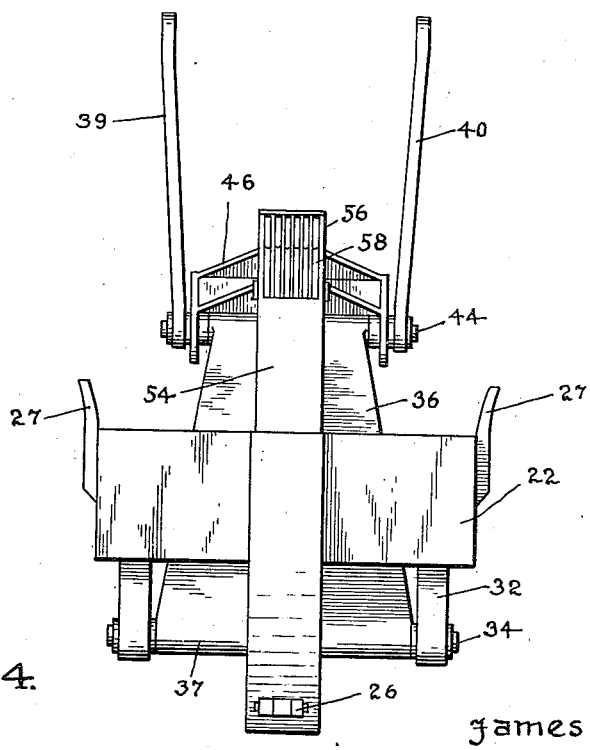
Figure 4 is an enlarged end elevational view of the truck also in the dumping position of Figure 2, but with the dump body omitted.

Depending from each of the frame members 12 and 14 adjacent their forward ends are shaft brackets 32, and extending laterally between these brackets is a fixed transversely extending shaft 34 to which is pivoted the forward end of a first toggle link 36. This toggle link is plate like in form, of heavy construction for purposes of strength, and its sides taper inwardly and rearwardly as shown in Figures 3 and 4.

The forward and wider end 37 of link 36 has an end bearing opening extending throughout its width where it embraces the shaft 34, and the rearward and narrower end of the plate is provided with a similar bearing opening throughout its width to embrace the toggle pivot as later described.

Figure 1:
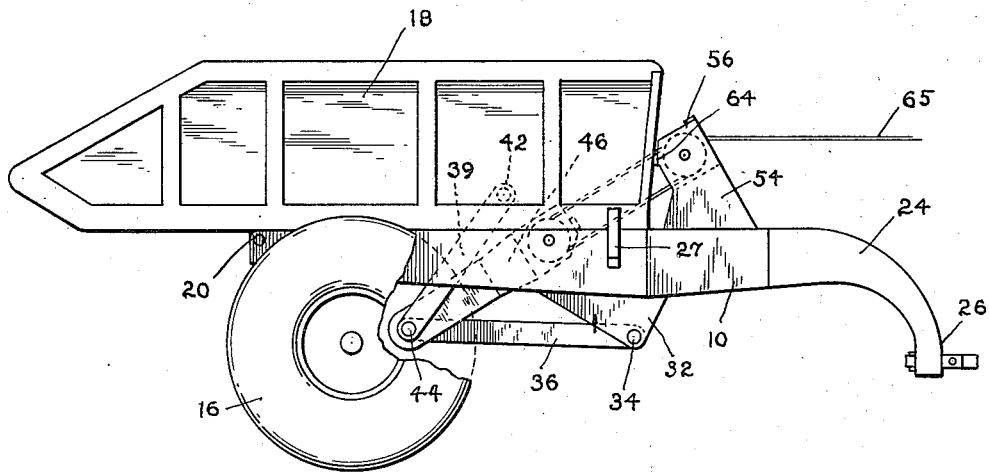
Figure 1 is a side elevational view of a truck body with the dumping compartment in its normal hauling position.

Referring to Figure 1, it will be noted that when the dump truck is in its normal hauling position, the first toggle link member 36 extends substantially horizontally and rearwardly from the fixed pivot shaft 34, and below the chassis 10. The second toggle link comprises a pair of spaced arms 39 and 40, each of these arms being pivoted at their upper ends to short pivot shafts 42 suitably carried by the inner faces of the frame members of the dump body. The pivots 42 are so positioned that the second toggle link members 39 and 40 form a vertical angle of substantially 60° with the toggle link 36 when the dump body is in its normal or hauling position, as shown in Figure 1. It will also be noted in Figure 3, that the second toggle link members 39 and 40 are also positioned for movement between the side frame members 12 and 14 of the chassis. Members 39 and 40 are pivoted at their opposite ends to a toggle pivot shaft 44. As shown in Figure 3, the rearward bearing end 38 of the first toggle link 36 centrally embraces the pivot shaft 44 throughout a substantial portion of its length, while toggle link members 39 and 40 are pivoted at the opposite ends of the shaft 44.

The toggle is actuated by a pulling arm or yoke 46 which is pivoted at its rearward end to the toggle shaft 44 and is provided at its forward end with means to connect with a suitable source of power. As shown in Figure 3, the pulling arm 46 is of yoke like construction, being bifurcated at its rearward end to form arms 48 and 50, these arms respectively carrying suitable bearing sleeves 52 and 53 which embrace the toggle pivot shaft 44 on opposite sides of the bearing end 38 of link 36, and between the same and the forward ends of the link members 39 and 40. It will be apparent from Figure 3 that the pulling arm 46 is also positioned for movement between the longitudinal side frame members 12 and 14 of the chassis, and that the bifurcated forward end of said arm straddles the first toggle member 36 adjacent the toggle pivot shaft 44 during movement of the toggle.

Figure 2:
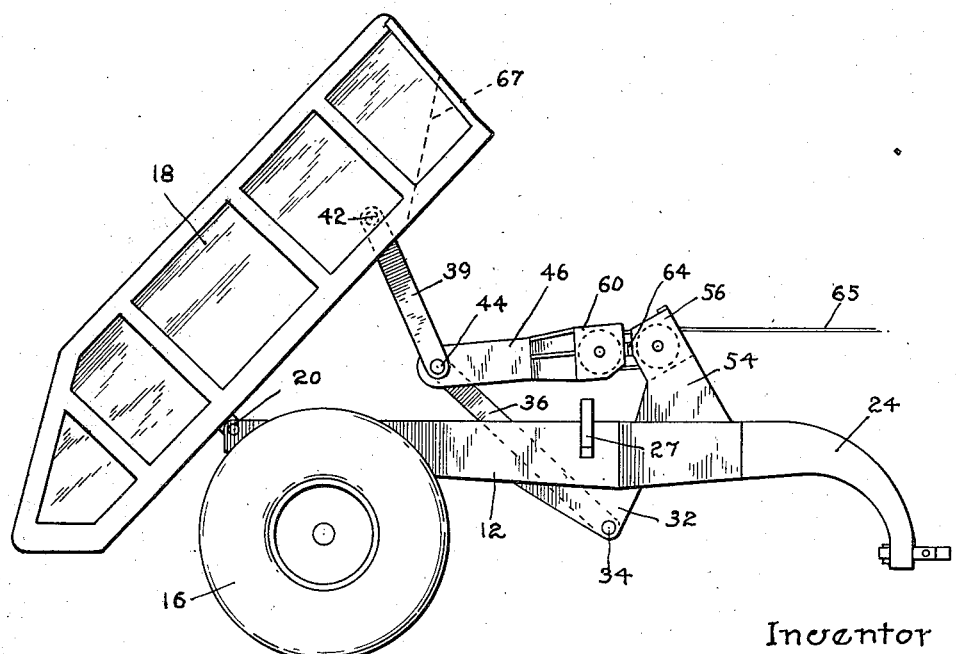
Figure 2 is a similar view showing the toggle mechanism in its actuated position with the truck body elevated to discharge the contents.

Mounted on the platform 22 of the chassis forwardly of the toggle members previously described and extending upwardly from the platform 22, is a fixed standard or post 54. This standard is adapted to receive the application of power from any suitable source to lift the dump body. It may be provided with a sheave housing 56 with sheaves 58 mounted for rotation on a suitable fixed shaft carried by the housing. Referring to Figures 2 and 3, the forward end of the pulling arm 46 is similarly equipped with a sheave housing 60 carrying a fixed shaft and sheaves 62 mounted for rotation thereon. As shown in Figure 2, a cable 64 extends from a suitable source of power (not shown) such as a winding and unwinding power reel or drum on a tractor or the like and is trained through the respective sheaves 58 and 62 in a manner well known in the art, and suitably secured at its terminal end. The cable 64 thus provides a flexible power connection between the fixed sheave housing 56 and the sheave housing 60 on the forward end of the pulling arm 46.

When the dump truck is in normal or hauling position, as shown in Figure 1, the pulling arm 46 extends from the toggle pivot 44 in the direction of the sheave housing 56, and in this position, it bisects the vertical angle formed by the toggle links 36 and 39, 40. The forward lower corner of the dump body may be grooved as at 67 if necessary, in order to clear the pulling arm 46.

When power is applied to the truck by winding in cable 64 and actuating sheaves 58 and 62, the pulling arm 46 is moved from the position shown in Figure 1 to that of Figure 2. By reason of the flexible power connection between sheave housings 56 and 60, the pull applied by the rearward end of the arm 46 will accommodate itself to the circular path of movement of the toggle pivot shaft 44 around the fixed pivot shaft 34. As shown in Figure 2, housings 56 and 60 are each provided with abutments 64, which engage one another when the pulling arm 46 is drawn to its most forward position. When these abutments engage one another, as in Figure 2, the pulling arm has drawn the toggle to a position just short of dead center, and it forms a rigid connection to the toggle from the fixed standard 54 on the chassis. It will be understood that the power source for the cable 64 will be equipped to hold the cable taut so that the toggle and its pulling arm may retain the rigid connection shown in Figure 2, and at this time, the dump truck may be vibrated in any suitable manner to discharge its contents. By reason of the position of the standard 54, and the length of the pulling arm 46, the actuated position of the toggle is short of dead center, as previously mentioned, and when the pull on the cable 64 is released, the weight of the dump body and connecting members will move the toggle links toward their normal position of Figure 1.

It will be understood that the source of power for the cable 64 will be provided with means to wind in or unwind the cable, and to hold the cable at any desired position, so that the dump body may be held in any intermediate position if desired.

It will be apparent that I have provided a dump truck and operating mechanism therefor of simple and rugged construction, and which can be actuated without the necessity for special means to accomplish initial lifting movement of the dump body around its shaft. By reason of the position of the toggle link pivots 34 and 44 below the longitudinal frame members of the chassis in the normal position of the dumping body, as shown in Figure 1, and the arrangement of the pivot points 42 so that toggle links 39 and 40 form a substantial angle with link 36 at the normal position of the dump body, power can be applied through the pulling arm 46 to immediately actuate the toggle and start the dumping body in its movement around the pivot 20. The construction described herein is such that the power applied is evenly distributed and a uniform lift on both sides of the dump body is accomplished. Of primary importance is the multiple function of the pulling arm 46, which serves as a power connection between the standard 54 and the toggle shaft 44, as a rigid connecting arm to hold and support the dump body in its elevated or discharging position and as a spacing member to retain the toggle short of dead center so that the dump body will easily lower by gravity when tension on the cable is relieved.

I claim:

1. In a dump vehicle, a chassis having spaced longitudinal frame members, a dump body pivoted at its rear portion to the rear of said chassis, a rearwardly extending first toggle link pivoted between said frame members and lying in a substantially horizontal plane when the dump body is in normal position, a second toggle link pivoted to the rearward end of said first link and to the dump body at such point that it forms a substantial angle with said first link when the dump body is in normal position, a standard positioned on said chassis above said frame members and forward of said links, a pulling arm pivotally connected at its rearward end to the pivot between said links and extending in a direction bisecting the angle between the same, and means for moving said pulling arm in a forward direction to open the angle between said links and to elevate the dump body including sheave and cable connections between said standard and the forward end of said pulling arm, said standard and the rearward end of said pulling arm having abutments to engage one another when the dump body is completely elevated, the position of the abutment on said standard and the length of said pulling arm being such that said pulling arm forms a rigid connection between said standard and the pivot between said links when the dump body is elevated to such a degree that said toggle links are just short of dead center.

2. In a dump vehicle, a chassis having spaced longitudinal frame members, a dump body pivoted at its rear portion to the rear of said chassis, a rearwardly extending first toggle link pivoted to the chassis below said frame members and lying in a substantially horizontal plane when the dump body is in normal position, a second toggle link pivoted to the rearward end of said first link and to the dump body at such point that it forms an angle of substantially 60° with said first link when the dump body is in normal position, a standard positioned on said chassis above said frame members and forward of said links, a pulling arm pivotally connected at its rearward end to the pivot between said links and extending in a direction bisecting the angle between the same, and means for moving said pulling arm in a forward direction to open the angle between said links and to elevate the dump body including sheave and cable connections between said standard and the forward end of said pulling arm.

3. In a dump vehicle, a chassis having spaced longitudinal frame members, a dump body pivoted at its rear portion to the rear of said chassis, a rearwardly extending first toggle link pivoted to the chassis below said frame members and lying in a substantially horizontal plane when the dump body is in normal position, a second toggle link pivoted to the rearward end of said first link and to the dump body at such point that it forms an angle of substantially 60° with said first link when the dump body is in normal position, a standard positioned on said chassis above said frame members and forward of said links, a pulling arm pivotally connected at its rearward end to the pivot between said links and extending in a direction bisecting the angle between the same, and means for moving said pulling arm in a forward direction to open the angle between said links and to elevate the dump body including sheave and cable connections between said standard and the forward end of said pulling arm, said standard and the rearward end of said pulling arm having abutments adapted to engage one another when the dump body is elevated, the position of the abutment on said standard and the length of said pulling arm being such that said toggle links are short of dead center when said abutments engage one another.

4. A dump vehicle of the character defined in claim 1 wherein the toggle links and pulling arm are all mounted for movement between the spaced longitudinal frame members.

5. A dump vehicle of the character defined in claim 1 wherein the first toggle link is a plate like member, the second toggle link comprising spaced arms positioned on each side of the rearward end of the plate like member at the pivot point between said links, and wherein the pulling arm is bifurcated adjacent its rearward end and straddles the plate like member at said pivot point.

JAMES T. ROGERS.